April 24, 1956     O. L. TAYLOR     2,743,339
ELECTROMAGNETIC CONTACTOR

Filed March 6, 1953     5 Sheets-Sheet 1

WITNESSES:

INVENTOR
Owen L. Taylor.
BY
ATTORNEY

April 24, 1956  O. L. TAYLOR  2,743,339
ELECTROMAGNETIC CONTACTOR
Filed March 6, 1953

WITNESSES:

INVENTOR
Owen L. Taylor.
BY
Paul E. Friedemann
ATTORNEY

April 24, 1956 O. L. TAYLOR 2,743,339
ELECTROMAGNETIC CONTACTOR
Filed March 6, 1953
5 Sheets-Sheet 5
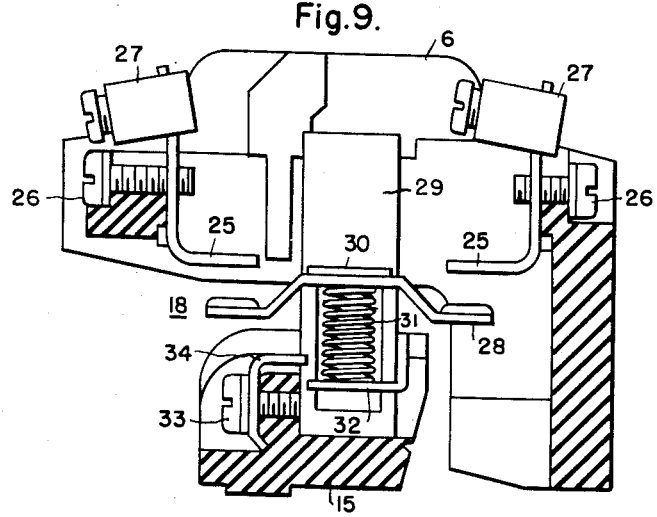
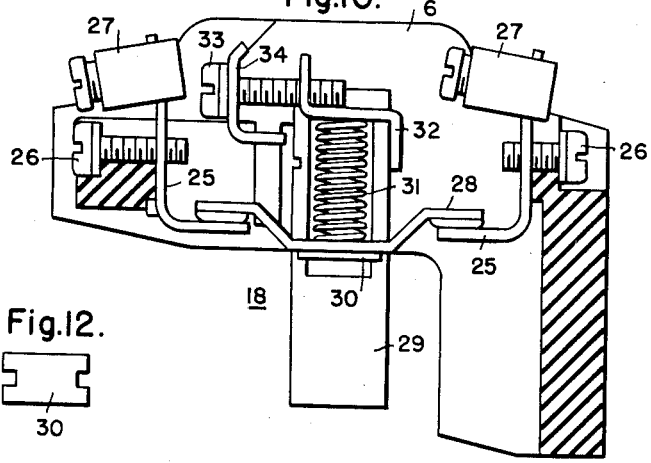
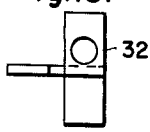
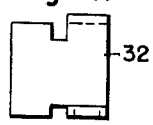
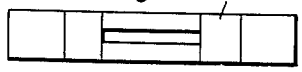
WITNESSES:
INVENTOR
Owen L. Taylor.
BY
ATTORNEY United States Patent Office 2,743,339
Patented Apr. 24, 1956

2,743,339

ELECTROMAGNETIC CONTACTOR

Owen L. Taylor, Easton, Conn., assignor to Westinghouse Electric Corporation, East Pittsburgh, Pa., a corporation of Pennsylvania Application March 6, 1953, Serial No. 340,860

8 Claims. (Cl. 200—165)

This invention relates to contactors and particularly to contactors of the type in which a single electromagnet is employed to control the opening or closing of a plurality of circuits by means of the operation of switches and contacts controlled by the energization or deenergization, as the case may be, of the electromagnet. A copending application by Owen L. Taylor entitled "Electromagnetic Contactor," assigned to the same assignee, and filed herewith, relates to other features of the same contactor.

An object of this invention is to provide an electromagnetic contactor of a construction in which all contacts are disposed to be readily accessible for inspection, for connections, and for reversal in operation from make to break or break to make.

Another object of this invention is to provide a circuit controlling device of the electromagnetically operated type in which the contacts are disposed to be readily accessible for inspection, or connections, and for reversal in operation from make to break or from break to make, and in which the load is applied to the armature along an axis perpendicular to the plane of the pole faces and substantially through the theoretical center area of all pole faces.

Still another object of this invention is to provide an electromagnetic contactor of a construction in which all contacts are disposed to be readily accessible for inspection, for connections, and for reversal of operation from make to break or break to make, and in which the armature pole faces may be aligned with the magnet pole faces to give a balanced load condition and the armature pole faces are held in alignment with the magnet pole faces or any condition of the circuit controlling device.

Another object of this invention is to provide an electromagnetic contactor of a simple and economical construction in which there is a maximum number of identical parts, and in which the parts are to be so disposed as to permit of relatively simple and quick assembly.

The objects recited are merely illustrative. Other objects and advantages will become more apparent from a study of the accompanying figures, in which:

Fig. 9 shows details of the contact assembly and contact supporting means with the contacts normally open;

Fig. 10 shows a detail view of the contact assembly and the contact supporting means with the contacts normally closed; and Figs. 11, 12, 13 and 14 show details of the contact assembly.

Figure 1:
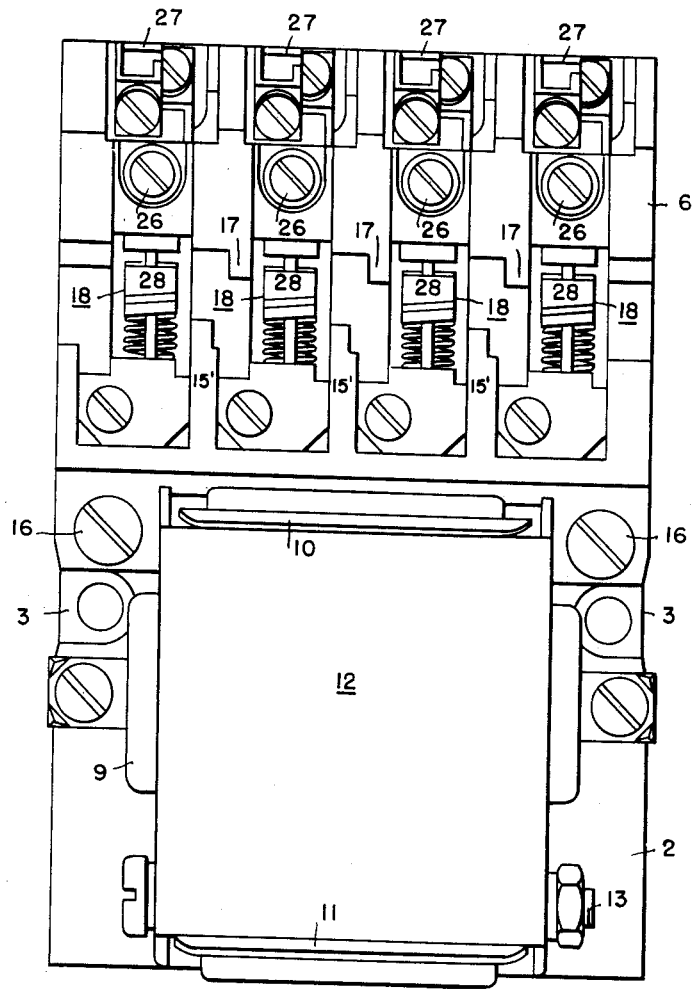
Figure 1 shows a front view of the assembled electromagnetic contactor.
Figure 2:
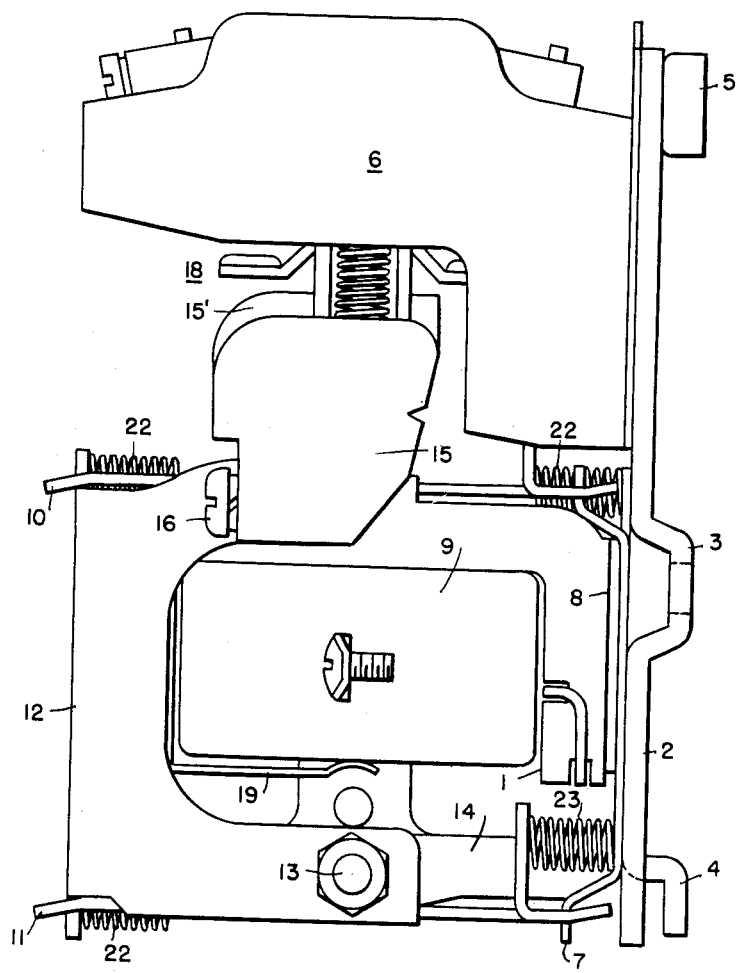
Fig. 2 shows a side view of the assembled electromagnetic contactor.

With specific reference to the form of the invention as illustrated in Figs. 1 and 2, a base plate 2 is provided with extended portions 3 and 4. The extended portions 3 have holes therein for receiving a bolt to fix the base plate of the relay to a panelboard. A resilient member 5, as, for example, a rubber grommet, is provided on the back of the base plate so that the extended portions 3 and 4 and the resilient member 5 will give a snug fit with a panelboard when the contactor is fixed thereto and permits positive mounting with only two mounting screws or bolts on surfaces which may not be perfectly flat. The resilient member 5 also absorbs the shock from the closing action of the contactor.

Contact support means 6 which supports fixed contact members 25, a bearing bracket 7, and an electromagnet bracket 8 are attached to the base plate 2 in any suitable manner (reference should be had to Figs. 9 and 10 and the description thereof for details of the fixed contact members). The electromagnet bracket 8 is comprised of two metallic members which fit on each side of the laminated electromagnet core 1 to hold the laminations together. A portion of each metallic member extends perpendicular to the plane of the laminations and away from the core 1 so that the metallic members may be fixed to the base plate and thus hold the core 1 in position. A coil 9 is provided on the center leg of the E-shaped electromagnet.

The bearing bracket 7 is one of four plates which form a parallelogram arrangement. The bearing bracket 7 has bearing surfaces at each end which are engaged by bearing edges of upper rocker arm 10 and the lower rocker arm 11, respectively. The opposite bearing edge of the upper rocker arm 10 engages a bearing surface of the armature bracket 12 and the bearing edge at the opposite end of the lower rocker arm 11 engages the lower bearing surface of the armature bracket 12. The armature bracket 12 has a bolt 13 projecting through two extensions on the armature bracket to secure the armature 14 of the contactor between the extensions. Extensions at the upper end of the armature bracket 12 are fixed to a contact actuating arm or support 15 by means of screws 16. The contact actuating arm 15 has extending wall portions 15' which mate with wall portions 17 of the contact support means 6. The mating wall portions 15' and 17 increase the arc path between contacts.

When the coil 9 is energized, it causes the armature 14 to pick up and thus transmit motion through the parallelogram linkage to the contact actuating arm 15. The contact assemblies 18 are actuated by the contact actuating arm 15 and thus the movable contacts of the contact assemblies 18 either bridge the fixed contacts supported by the contact support means 6 or open the circuit between the fixed contacts. The coil 9 is held in position on the center leg of the E-shaped electromagnet by means of spring members 19 fixed to the electromagnet bracket 8 on the sides of the electromagnet. The spring members 19 are fixed in such a manner that they may be rotated out of contact with the coil 9 to allow easy removal of the coil.

Figure 3:
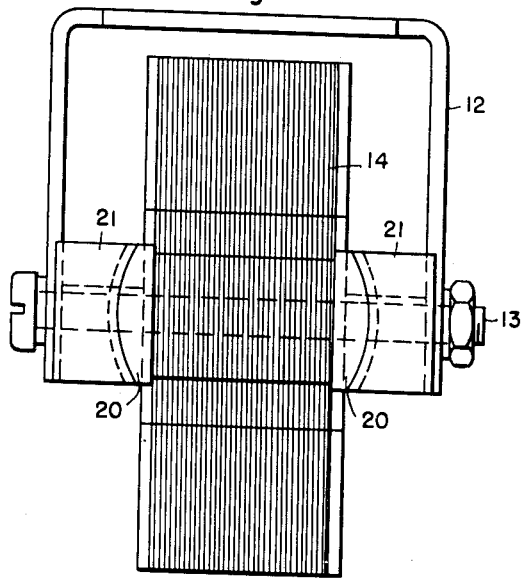
Figs. 3, 4 and 5 show details of the armature and the armature bracket.
Figure 4:
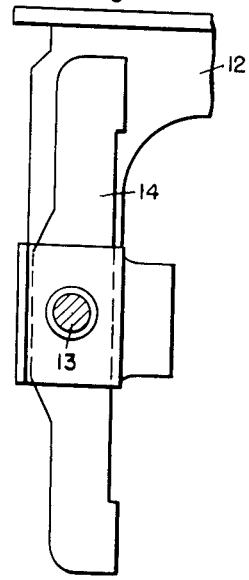
Figure 5:
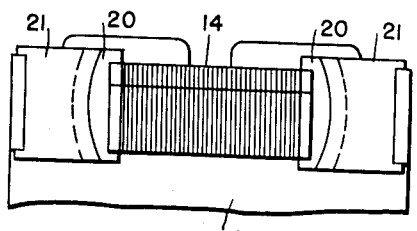

Figs. 3, 4 and 5 show the details of how the armature 14 is fixed to the armature bracket 12. The armature 14 is provided with spacer members 20 along its outer surfaces and the armature bracket 12 is provided with spacer members 21. The spacer members 20 are in the shape of segments of a sphere, and the spacer members 21 are shaped as matching segmental spherical sockets for the members 20.

The bolt 13 passes through the extensions on armature bracket 12, the armature 14 and the spacer members 20 and 21. Thus, it is seen the armature can move about any axis intersecting the theoretical center of the sphere of which space members 20 are segments within the limits imposed by the clearance to the mounting bolt 13. Before final adjustment, the nut on bolt 13 is tightened just enough that there is considerable friction at the spherical joint. Thus, when the electromagnetic contactor is energized several times, the faces of the armature 14 are brought into forceful contact with the faces of the electromagnet and the pole faces align themselves and the load is applied at the center of the ball, or sphere, which in turn gives a balanced load condition. Since considerable friction is involved in the area of contact at the spherical contact surfaces, there will be no relative movement of the armature 14 and the armature bracket 12 after the pole faces have been aligned. As a consequence, the armature pole faces are held in alignment with the magnet pole faces regardless of whether the device is sealed, open, or in transition. After the original pole face alignment, the nut on the mounting bolt 13 is tightened, thus increasing the frictional force in the joint which insures there will be no movement in the armature mounting joint and consequently the resulting wear in the joint is eliminated and also wear of the pole faces due to misalignment.

Figure 6:
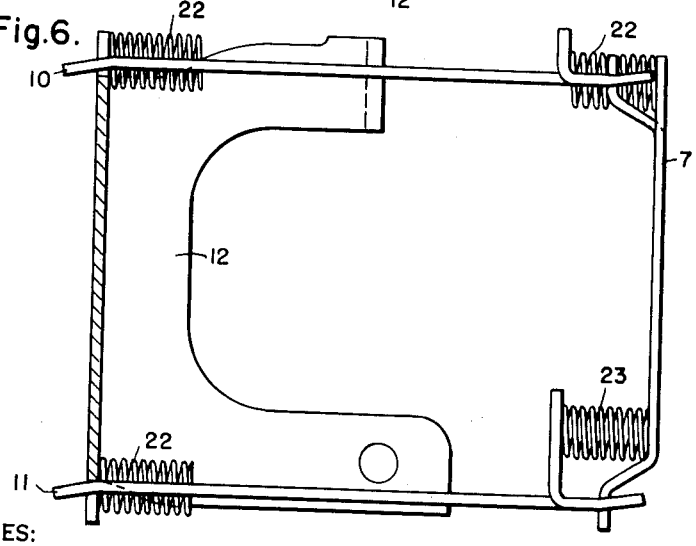
Fig. 6 shows the parallelogram arrangement through which motion is transmitted from the armature to the contact actuating means.
Figure 7:
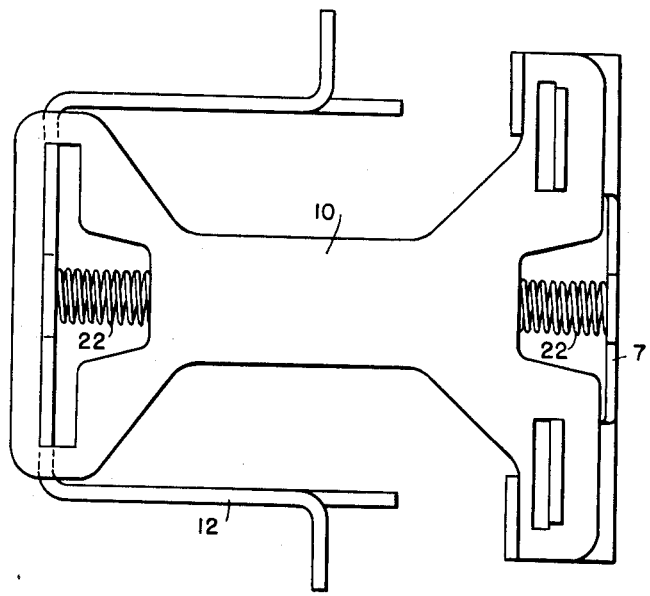
Figs. 7 and 8 show details of the parallelogram arrangement.
Figure 8:
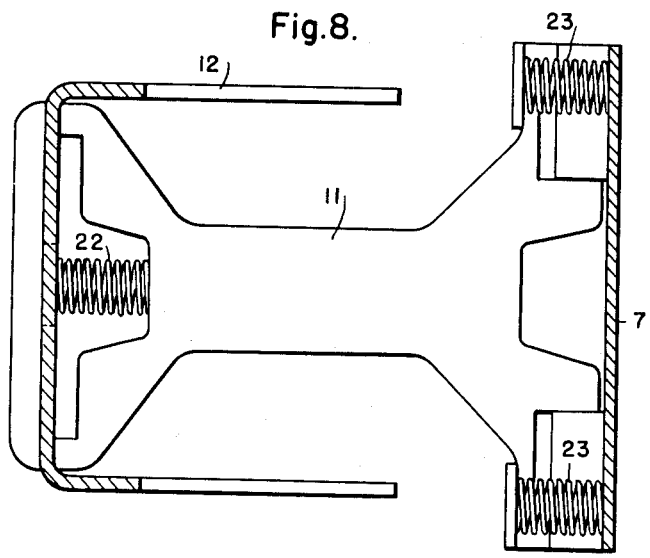

The parallelogram arrangement may be seen more clearly in Figs. 6, 7 and 8 wherein the armature bracket 12 mounts on two identical rocker arms 10 and 11. The bearing formed at the junction of the rocker arms 10 and 11 and the armature bracket E are of the knife-edge type. The opposite ends of the two rocker arms 10 and 11 are mounted on the bearing bracket 7 and the bearing formed by the junction of the rocker arms 10 and 11 with the bearing bracket 7 are also of the knife-edge type. The bearing formed by the junction of the upper rocker arm 10 with the bearing bracket 7 and the bearings formed by the upper rocker arm 10 and the lower rocker arm 11 with the armature bracket 12 are spring loaded by small compression springs 22 which are identical. The two springs 23 at the bearing formed by the junction of the lower rocker arm 11 with the bearing bracket 7 perform the dual function of keeping the bearing spring loaded and also providing a torque couple at the bearing to provide a positive return force for the armature 14 when the electromagnetic coil 9 is deenergized. The two rocker arms are shown as identical to simplify the manufacture but it will be noted that they are not used in exactly the same manner and, therefore, are not necessarily identical.

Figs. 9, 10, 11, 12, 13 and 14 show details of the contact support means 6 and the movable contact structure 18. The Figs. 9 and 10 are views of sections through the recesses in the contact support means 6. The stationary contact members 25 are held in position by screws 26 in slots in the contact support means. Terminals 27 from the stationary contact members 25 are brought out above the contact support means 6 so they are readily accessible.

The moving contact members 28 have a slit along the longitudinal axis which allows mounting on a flat guide 29 and are formed such that the plane of the contact portions are tilted slightly from the plane of the contact portions of the stationary contact members 25 so as to give a slight rolling or wiping action to insure good contact with a minimum of wear. A keeper 30 is inserted in the opening in the flat guide member 29 between the movable contact member 28 and the edge of the opening in the flat guide member 29 to limit the travel of the moving contact which is free to move upon the flat guide member 29 which is biased by a contact spring 31. A bracket 32 is inserted in the opening in the flat guide member 29 at the opposite end of the opening from the movable contact member 28 so that it is also biased in place by the spring member 31. The bracket has a hole for a mounting screw 33. Integral with the screw 33 is clamp 34 which serves to mount the assembly to the contact actuating arm 15, as is shown in Fig. 9, or to hang the movable contact assembly 18 from the contact support means 6, as is shown in Fig. 10. The mounting screw 33 is preferably staked on its end to prevent removal from the bracket 32. If the movable contact assembly 18 is mounted to the contact actuating arm 15, as shown in Fig. 9, the contact means is normally open and when the armature 14 is picked up the movable contacts 28 are forced to bridge the stationary contacts 25.

The normally closed contact assembly as shown in Fig. 10 is such that movement of the contact actuating arm 15 will move the flat guide member 29 upward and thus cause the movable contacts 28 to be lifted from the stationary contact members 25. The configuration of the contact actuating arm 15, the clamp 34 and bracket 32, the flat guide member 29 and the contact support means 6 are such and the inter-relationship of these parts are such that the flat guide member 34 can be clamped only in the one position giving the right contact gap alignment travel over travel, etc., for the contacts in either the normally open or normally closed arrangement.

To change from normally open to normally closed contact assembly, it is merely necessary to remove the two contact actuating arm mounting screws 16, loosen the mounting screw 33 for the flat guide member 29, slide the removable contact assembly 18 from the contact actuating arm 15, insert the assembly in the contact support means as shown in Fig. 9, tighten the mounting screw 33 and replace the contact actuating arm 15. The design is such that it is possible to assemble only in the correct position and with the minimum of wasted motion.

It will be recognized that the objects of the invention have been achieved by providing an electromagnetic contactor whereby a single electromagnet is employed to control the opening or closing of a plurality of circuits by means of the operation of switches and contacts and by providing contacts that are easily reversed from make to break or break to make. In addition, the electromagnetic contactor provides that the load will be applied to the armature along an axis perpendicular to the plane of the pole faces and substantially through the theoretical center area of all pole faces resulting in a minimum of wear both on the pole faces and also in the armature mounting joint.

While in accordance with the patent statutes one best known embodiment of the invention has been illustrated and described in detail, it is to be particularly understood that the invention is not limited thereto or thereby but that the inventive scope clearly includes equivalents.

I claim as my invention:

1. An electric circuit controlling device comprising, stationary contact support means, stationary contact members fixed to said stationary contact support means, movable contact means for bridging said stationary contact means, said movable contact means having a slit along its longitudinal axis, a flat guide member slidably fitted through said slit and having an opening therein, a keeper plate fitted in the opening in the flat guide member and having its plane perpendicular to the plane of said flat guide member for limiting the travel of the movable contact at one end of said opening, supporting means including a bracket means having a portion thereof projecting through the opening in said flat guide member, said bracket means being slidable along said guide member and being stopped by the other end of said opening, a resilient biasing member biasing said bracket means, said movable contact means and said keeper plate into position with said bracket means adjacent one end of said opening and said movable contact and keeper adjacent the other end of said opening, movable contact support means operable from a normal position toward said stationary contact support means, and mounting means providing selective supporting of said guide member in a first position in which said guide member is secured to said movable contact support means and said movable contact means is displaced from said stationary contact members when said movable contact support means is in said normal position providing normally open contact operation, and in a second position in which said bracket means is secured to said stationary contact support means with said movable contact means spring loaded in bridging relation with said stationary contact members, said guide member being disposed for engagement and movement by said movable contact support means upon movement thereof from said normal position to disengage said movable contact means from said stationary contact members.

2. An electric circuit controlling device comprising, stationary contact support means, stationary contact members fixed to said stationary contact support means, movable contact means for bridging said stationary contact means, said movable contact means having a slit along its longitudinal axis, a flat guide member slidably fitted through said slit and having an opening therein, a keeper plate fitted in the opening in the flat guide member and having its plane perpendicular to the plane of said flat guide member for limiting the travel of the movable contact at one end of said opening, a bracket means having a portion thereof projecting through the opening in said flat guide member, said bracket means being slidable along said guide member and being stopped by the other end of said opening, a resilient biasing member biasing said bracket means, said movable contact means and said keeper plate into position with said bracket means adjacent one end of said opening and said movable contact and keeper adjacent the other end of said opening, movable contact support means operable from a normal position toward said stationary contact support means, and mounting means providing selective supporting of said guide member in a first position in which said guide member is secured to said movable contact support means and said movable contact means is displaced from said stationary contact members when said movable contact support means is in said normal position providing normally open contact operation, and in a second position in which said bracket means is secured to said stationary contact support means with said movable contact means spring loaded in bridging relation with said stationary contact members, said guide member being disposed for engagement and movement by said movable contact support means upon movement thereof from said normal position to disengage said movable contact means from said stationary contact members, said mounting means comprising clamp means fixed to said guide member and said movable contact support means in said first position.

3. An electric circuit controlling device comprising, stationary contact support means, stationary contact members fixed to said stationary contact support means, movable contact means for bridging said stationary contact means, said movable contact means having a slit along its longitudinal axis, the plane of the contact portion of said movable contact means being tilted with respect to the contact portion of the stationary contact members to effect a wiping action of said contact members when said movable contact means bridge said stationary contact members, a flat guide member slidably fitted through said slit and having an opening therein, a keeper plate fitted in the opening in the flat guide member and having its plane perpendicular to the plane of said flat guide member for limiting the travel of the movable contact at one end of said opening, supporting means including a bracket means having a portion thereof projecting through the opening in said flat guide member, said bracket means being slidable along said guide member and being stopped by the other end of said opening, a resilient biasing member biasing said bracket means, said movable contact means and said keeper plate into position with said bracket means adjacent one end of said opening and said movable contact and keeper adjacent the other end of said opening, movable contact support means operable from a normal position toward said stationary contact support means, and mounting means providing selective supporting of said guide member in a first position in which said guide member is secured to said movable contact support means and said movable contact means is displaced from said stationary contact members when said movable contact support means is in said normal position providing normally open contact operation, and in a second position in which said bracket means is secured to said stationary contact support means with said movable contact means spring loaded in bridging relation with said stationary contact members, said guide member being disposed for engagement and movement by said movable contact support means upon movement thereof from said normal position to disengage said movable contact means from said stationary contact members.

4. An electric circuit controlling device comprising, stationary contact support means, stationary contact members fixed to said stationary contact support means, movable contact means for bridging said stationary contact means, said movable contact means having a slit along its longitudinal axis, the plane of the contact portion of said movable contact means being tilted with respect to the contact portion of the stationary contact members to effect a wiping action of said contact members when said movable contact means bridge said stationary contact members, a flat guide member slidably fitted through said slit and having an opening therein, a keeper plate fitted in the opening in the flat guide member and having its plane perpendicular to the plane of said flat guide member for limiting the travel of the movable contact at one end of said opening, a bracket means having a portion thereof projecting through the opening in said flat guide member, said bracket means being slidable along said guide member and being stopped by the other end of said opening, a resilient biasing member biasing said bracket means, said movable contact means, and said keeper plate into position with said bracket means adjacent one end of said opening and said movable contact and keeper adjacent the other end of said opening, movable contact support means operable from a normal position toward said stationary contact support means, and mounting means providing selective supporting of said guide member in a first position in which said guide member is secured to said movable contact support means and said movable contact means is displaced from said stationary contact members when said movable contact support means is in said normal position providing normally open contact operation, and in a second position in which said bracket means is secured to said stationary contact support means with said movable contact means spring loaded in bridging relation with said stationary contact members, said guide member being disposed for engagement and movement by said movable contact support means upon movement thereof from said normal position to disengage said movable contact means from said stationary contact members, said mounting means comprising clamp means fixed to said guide member and said movable contact support means in said first position.

5. An electric switch comprising, a stationary contact support, a movable contact support movable towards and away from said stationary contact support, a guide member, a movable contact slidably mounted on said guide member, said guide member having a mounting end, spring seat means slidably mounted on said guide member adjacent said mounting end, spring means disposed between said spring seat means and said movable contact and biasing said movable contact away from said spring seat means a given distance, a stationary contact mounted on said stationary contact support, mounting means on said movable contact support receiving and securing said mounting end of said guide member, said mounting means spacing said movable contact from said stationary contact, providing normally open contact operation, and means providing mounting for said guide member for normally closed contact operation comprising mounting means on said stationary contact support on the side of said stationary contact opposite said movable contact support, said last-named mounting means having a surface for receiving and securing said spring seat means and positioning said guide member in a position which is inverted with respect to the position thereof when mounted on said movable contact support, the spacing of said surface from said stationary contact being less than said given distance whereby said movable contact is spring loaded against said stationary contact, and movement of said movable contact support toward said stationary support engages the end of said guide member opposite said mounting end sliding said guide member through said spring seat means and lifting said movable contact from said stationary contact.

6. An electric switch comprising, a stationary contact support, a movable contact support disposed for movement from a normal position towards said stationary contact support, a stationary contact mounted on said stationary contact support, a guide member having a mounting end, a movable contact slidably mounted on said guide member, spring seat means slidably mounted on said guide member adjacent said mounting end, a spring disposed between said spring seat means and said movable contact, a stop on said guide member arresting movement of said movable contact away from said spring seat means at a given distance from said spring seat means, mounting means on said movable contact support for receiving and securing said mounting end of said guide member with said spring seat means spaced a distance from said stationary contact which is greater than said given distance when said movable contact support is in said normal position thereby providing for normally open said contact operation, mounting means on said stationary contact support for receiving and securing said spring seat means with said guide member inverted with respect to the position thereof when secured to said movable contact support, said last-named mounting means being disposed on the side of said stationary contact opposite to said movable contact support and being spaced from said stationary contact a distance less than said given distance whereby said movable contact is spring loaded against said stationary contact, the remaining end of said guide member being disposed in the path of movement of said movable contact support from said normal position to be displaced thereby and lift said movable contact from said stationary contact, said guide member being selectively mounted in said normally open and said normally closed contact positions.

7. An electric switch comprising, a guide member having a mounting end, a movable contact slidably mounted on said guide member, spring seat means slidably mounted on said guide member adjacent said mounting end, a stop engaging said spring seat means preventing movement thereof toward said mounting end, a stop on said guide member limiting movement of said movable contact member toward the other end of said guide member, said stops spacing said spring seat means and said movable contact a given distance apart, spring means disposed between said spring seat means and said movable contact biasing said spring seat means and said movable contact against their respective stops, a stationary contact support, a stationary contact mounted on said stationary contact support, a movable contact support operated from a normal position towards said stationary contact support, first mounting means on said movable contact support adapted to receive and secure said mounting end of said guide member, second mounting means on said stationary contact support adapted to receive and secure said spring seat means, said first mounting means being spaced from said stationary contact a distance greater than said given distance, when said movable contact support is in said normal position, said second mounting means being disposed at a distance from said stationary contact which is less than said given distance and on the side of said stationary contact opposite from said movable contact support, said guide member being selectively supported in a first position with said mounting end secured to said first mounting means for normally open contact operation and in a second position with said spring seat means secured to said second mounting means for normally closed contact operation.

8. An electric switch comprising, a guide member having a mounting end, a movable contact slidably mounted on said guide member, spring seat means slidably mounted on said guide member, respective stop means on said guide member limiting movement of said movable contact and said spring seat means away from each other, spring means disposed between said spring seat means and said movable contact and normally biasing said spring seat means and said movable contact against said respective stops and affording their spacing at a given distance apart, a stationary contact support, a stationary contact mounted on said stationary contact support, a movable contact support movable from a normal position toward said stationary contact support, and means for selectively supporting said guide member in a first position with said mounting end secured to said movable contact support and said movable contact spaced from said stationary contact when said movable contact support is in said normal position, for normally open contact operation, and in a second position in which said guide member is inverted with respect to said first position with said spring seat means secured to said stationary contact support and said movable contact spring loaded against said stationary contact, the end of said guide member opposite said mounting end being disposed adjacent to and in the path of movement of said movable contact support to be engaged and moved by said movable contact support upon movement thereof toward said stationary contact support to disengage said movable contact from said stationary contact.

References Cited in the file of this patent

UNITED STATES PATENTS

| | | |
|---|---|---|
| 2,239,031 | Bierenfeld et al. | Apr. 22, 1941 |
| 2,266,618 | Stimson | Dec. 16, 1941 |
| 2,276,698 | Pierce | Mar. 17, 1942 |
| 2,304,972 | Van Valkenburg et al. | Dec. 15, 1942 |
| 2,360,744 | Van Valkenburg et al. | Oct. 17, 1944 |
| 2,532,305 | Heller | Dec. 5, 1950 |
| 2,538,036 | Ponstingl | Jan. 16, 1951 |
| 2,561,991 | Ponstingl | July 24, 1951 |